(12) United States Patent
Rochberger et al.

(10) Patent No.: US 6,456,600 B1
(45) Date of Patent: Sep. 24, 2002

(54) COMPLEX NODE REPRESENTATION IN AN ASYNCHRONOUS TRANSFER MODE PNNI NETWORK

(75) Inventors: Haim Rochberger, Netanya; Meir Morgenstern, Or Yehuda; David Margolis, Haifa, all of (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/300,882

(22) Filed: Apr. 28, 1999

(51) Int. Cl.[7] .............................................. H04L 12/28
(52) U.S. Cl. .................... 370/255; 370/238.1; 370/252; 370/395.1; 709/220
(58) Field of Search .............................. 370/238, 238.1, 370/254–257, 395.1, 396, 395.5, 395.51, 400, 408, 252; 709/220, 223

(56) References Cited

U.S. PATENT DOCUMENTS

| | | | |
|---|---|---|---|
| 5,291,477 A | 3/1994 | Liew | 370/54 |
| 5,361,256 A | 11/1994 | Doeringer et al. | 370/60 |
| 5,420,862 A | 5/1995 | Perlman | 370/85.13 |
| 5,455,865 A | 10/1995 | Perlman | 380/49 |
| 5,483,536 A | 1/1996 | Gunji et al. | 370/85.14 |
| 5,491,690 A | 2/1996 | Alfonsi et al. | 370/60 |
| 5,495,479 A | 2/1996 | Galaand et al. | 370/60 |
| 5,544,327 A | 8/1996 | Dan et al. | 395/250 |
| 5,550,818 A | 8/1996 | Brackett et al. | 370/60 |
| 5,566,124 A | 10/1996 | Glance | 359/124 |
| 5,590,118 A | 12/1996 | Nederlof | 370/218 |
| 5,600,638 A | 2/1997 | Bertin et al. | 370/351 |
| 5,603,029 A | 2/1997 | Aman et al. | 395/675 |
| 5,629,930 A | 5/1997 | Beshai et al. | 370/396 |
| 5,649,108 A | 7/1997 | Spiegel et al. | 395/200.12 |
| 5,673,263 A | 9/1997 | Basso et al. | 370/396 |
| 5,831,975 A | * 11/1998 | Chen et al. | 370/256 |
| 5,999,517 A | * 12/1999 | Koning et al. | 370/255 |
| 6,078,586 A | * 6/2000 | Dugan et al. | 370/395 |
| 6,115,753 A | * 9/2000 | Joens | 709/242 |
| 6,208,623 B1 | * 3/2001 | Rochberger et al. | 370/254 |
| 6,243,384 B1 | * 6/2001 | Eriksson et al. | 370/395 |
| 6,333,918 B1 | * 12/2001 | Hummel | 370/238 |

\* cited by examiner

*Primary Examiner*—Ricky Ngo
*Assistant Examiner*—Tri H. Phan
(74) *Attorney, Agent, or Firm*—Howard Zaretsky

(57) ABSTRACT

A method of calculating a complex node representation for logical nodes in a hierarchical peer group in a PNNI based ATM network. The summary information for default spokes, exceptions and bypasses is determined in a way that closely represents the underlying metrics associated with the peer group. A list of all border nodes in the peer group is generated and maintained and a matrix of tables is generated, one table for each metric per each class of service. The table is populated by the best value associated with the corresponding metric for a particular pair of border nodes within a particular class of service. Once the table is populated, each element is placed in a group or bin. The bins are generated by dividing the full range of the metric into a plurality of smaller subgroups or bins. The bin having a count greater than a threshold count is selected and 80% of the worst value for that group is used as the default spoke. If no bin exists having at least a threshold count, the number of bins is reduced by one and a new set of subranges is calculated. The elements of the table are placed in the newly divided bins and a scan is performed once again.

15 Claims, 6 Drawing Sheets

COMPLEX NODE REPRESENTATION IN AN ASYNCHRONOUS TRANSFER MODE PNNI NETWORK

FIELD OF THE INVENTION

The present invention relates generally to data communications networks and more particularly relates to a method of representing a complex node in an ATM based PNNI network.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by the ATM Forum. The previous Phase 0 draft specification is referred to as the Interim Inter-Switch Signaling Protocol (IISP). The goal of the PNNI specifications is to provide customers of ATM network equipment a level of multi-vendor interoperability.

PNNI Phase 1

As part of the ongoing enhancement to the ATM standard by work within the ATM Forum and other groups, the Private Network to Network Interface (PNNI) protocol Phase 1 has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well-known link state routing technique.

The second protocol is effective for signaling, i.e., the message flows used to establish point-to-point and point-to-multipoint connections across the ATM network. This protocol is based on the ATM Forum User to Network Interface (UNI) signaling with mechanisms added to support source routing, crankback and alternate routing of source SETUP requests in the case of bad connections.

With reference to the PNNI Phase 1 specifications, the PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical link becomes operational, the nodes attached to it initiate and exchange information via a well known Virtual Channel Connection (VCC) used as a PNNI Routing Control Channel (RCC).

Hello messages are sent periodically by each node on this link. In this fashion the Hello protocol makes the two neighboring nodes known to each other. Each node exchanges Hello packets with its immediate neighbors to determine its neighbor's local state information. The state information includes the identity and peer group membership of the node's immediate neighbors and a status of its links to its neighbors. Each node then bundles its state information in one or more PNNI Topology State Elements (PTSEs) which are subsequently flooded throughout the peer group.

PTSEs are the smallest collection of PNNI routing information that is flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical link begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has completed successfully. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received its component PTSEs are examined. Each PTSE is acknowledged by encapsulating information from its PTSE header within the acknowledgment packet that is sent back to the sending neighbor. If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originated a particular PTSE can re-originate that particular PTSE. PTSEs are reissued both periodically and on an event driven basis.

As described previously, when a node first learns about the existence of a neighboring peer node which resides in the same peer group, it initiates the database exchange process in order to synchronize its topology database with that of its neighbor's. The database exchange process involves exchanging a sequence of database summary packets that contain the identifying information of all PTSEs in a node topology database. The database summary packet performs an exchange utilizing a lock step mechanism whereby one side sends a database summary packet and the other side responds with its own database summary packet, thus acknowledging the received packet.

When a node receives a database summary packet from its neighboring peer, it first examines its topology database for the presence of each PTSE described within the packet. If the particular PTSE is not found in its topology database or if the neighboring peer has a more recent version of the PTSE then the node requests the PTSE from the particular neighboring peer or optionally from another neighboring peer whose database summary indicates that it has the most recent version of the PTSE.

A corresponding neighboring peer data structure is maintained by the nodes located on either side of the link. The neighboring peer data structure includes information required to maintain database synchronization and flooding to neighboring peers.

It is assumed that both nodes on either side of the link begin in the Neighboring Peer Down state. This is the initial state of the neighboring peer for this particular state machine. This state indicates that there are no active links through the neighboring peer. In this state, there are no adjacencies associated with the neighboring peer either. When the link reaches the point in the Hello protocol where both nodes are able to communicate with each other, the event AddPort is triggered in the corresponding neighboring peer state machine. Similarly when a link falls out of communication with both nodes the event DropPort is triggered in the corresponding neighboring peering state machine. The database exchange process commences with the event AddPort which is thus triggered but only after the first link between the two neighboring peers is up. When the DropPort event for the last link between the neighboring peers occurs, the neighboring peer state machine will internally generate the DropPort last event closing all state information for the neighboring peers to be cleared.

It is while in the Negotiating state that the first step is taken in creating an adjacency between two neighboring peer nodes. During this step it is decided which node is the master, which is the slave and it is also in this state that an initial Database Summary (DS) sequence number is decided upon. Once the negotiation has been completed, the Exchanging state is entered. In this state the node describes its topology database to the neighboring peer by sending it database summary packets.

After the peer processes the database summary packets, the missing or updated PTSEs can then be requested. In the Exchanging state the database summary packets contain summaries of the topology state information contained in the node's database. In the case of logical group nodes, those portions of the topology database that originated or were received at the level of the logical group node or at higher levels is included in the database summary. The PTSP and PTSE header information of each such PTSE is listed in one of the node's database packets. PTSEs for which new instances are received after the exchanging status have been entered may not be included in a database summary packet since they will be handled by the normal flooding procedure.

The incoming data base summary packet on the receive side is associated with a neighboring peer via the interface over which it was received. Each database summary packet has a database summary sequence number that is implicitly acknowledged. For each PTSE listed, the node looks up the PTSE in its database to see whether it also has an instance of that particular PTSE. If it does not or if the database copy is less recent, then the node either re-originates the newer instance of the PTSE or flushes the PTSE from the routing domain after installing it in the topology database with a remaining lifetime set accordingly.

Alternatively, if the listed PTSE has expired, the PTSP and PTSE header contents in the PTSE summary are accepted as a newer or updated PTSE with empty contents. If the PTSE is not found in the node's topology database, the particular PTSE is put on the PTSE request list so it can be requested from a neighboring peer via one or more PTSE request packets.

If the PTSE request list from a node is empty, the database synchronization is considered complete and the node moves to the Full state.

However, if the PTSE request list is not empty then the Loading state is entered once the node's last database summary packet has been sent but the PTSE request list is not empty. At this point, the node now knows which PTSE needs to be requested. The PTSE request list contains a list of those PTSEs that need to be obtained in order to synchronize that particular node's topology database with the neighboring peer's topology database. To request these PTSEs, the node sends the PTSE request packet which contains one or more entries from the PTSE request list. The PTSE request list packets are only sent during the Exchanging state and the Loading state. The node can sent a PTSE request pack to a neighboring peer and optionally to any other neighboring peers that are also in either the Exchanging state or the Loading state and whose database summary indicate that they have the missing PTSEs.

The received PTSE request packets specify a list of PTSEs that the neighboring peer wishes to receive. For each PTSE specified in the PTSE request packet, its instance is looked up in the node's topology database. The requested PTSEs are subsequently bundled into PTSPs and transmitted to the neighboring peer. Once the last PTSE and the PTSE request list has been received, the node moves from the Loading state to the Full state. Once the Full state has been reached, the node has received all PTSEs known to be available from its neighboring peer and links to the neighboring peer can now be advertised within PTSEs.

A major feature of the PNNI specification is the routing algorithm used to determine a path for a call from a source user to a destination user. The routing algorithm of PNNI is a type of link state routing algorithm whereby each node is responsible for meeting its neighbors and learning their identities. Nodes learn about each other via the flooding of PTSEs described hereinabove. Each node computes routes to each destination user using the information received via the PTSEs to form a topology database representing a view of the network.

Using the Hello protocol and related FSM of PNNI, neighboring nodes learn about each other by transmitting a special Hello message over the link. This is done on a continual periodic basis. When a node generates a new PTSE, the PTSE is flooded to the other nodes within its peer group. This permits each node to maintain an up to date view of the network.

Once the topology of the network is learned by all the nodes in the network, routes can be calculated from source to destination user. A routing algorithm commonly used to determine the optimum route from a source node to a destination node is the Dijkstra algorithm. The Dijkstra algorithm is used to generate the Designated Transit List which is the routing list used by each node in the path during the setup phase of the call. Used in the algorithm are the topology database (link state database) which includes the PTSEs received from each node, a Path List comprising a list of nodes for which the best path from the source node has been found and a Tentative List comprising a list of nodes that are only possibly the best paths. Once it is determined that a path is in fact the best possible, the node is moved from the Tentative List to the Path List.

The algorithm begins with the source node (self) as the root of a tree by placing the source node ID onto the Path List. Next, for each node N placed in the Path List, N's nearest neighbors are examined. For each neighbor M, add the cost of the path from the root to N to the cost of the link from N to M. If M is not already in the Path List or the Tentative List with a better path cost, M is added to the Tentative List.

If the Tentative List is empty, the algorithm terminates. Otherwise, the entry in the Tentative List with the minimum cost is found. That entry is moved to the Path List and the examination step described above is repeated.

Complex Node

The ATM PNNI specification provides for a topological hierarchy that can extend up to 10 levels. The hierarchy is built from the lowest upward with the lowest level representing the physical network. A node in the lowest level represents just itself and no other nodes. Nodes in the upper levels, i.e., two through ten, are represented by what are known as logical nodes. A logical node does not exist physically but is an abstraction of a node. A logical node represents an entire peer group but at a higher level in the hierarchy.

A complex node representation is used to represent the aggregation of nodes in a peer group at the level of the logical node. The metrics, attributes and/or parameters (hereinafter referred to simply as metrics) of the links and nodes within the peer group are represented in summarized form. This permits peer groups with large numbers of nodes and links to be represented in a simple fashion.

Prior art methods of generating this summary information typically comprise calculating one or more averages of the metrics associated with the routes, links and nodes within the peer group. A disadvantage of this method is that when taking averages, a few very large or small values will cause the results to be skewed. It is desirable to have a method of constructing a complex node whereby the underlying routes, links and nodes are summarized to in a way that provides better representation.

SUMMARY OF THE INVENTION

The present invention is a method of calculating a complex node representation for logical nodes in a hierarchical peer group in a PNNI based ATM network. The method provides a solution for the problems associated with the prior art method of using averages to determine the summary information used in the representation of complex nodes. The method of the present invention determines the summary information for default spokes, exceptions and bypasses in a way that better represents the underlying metrics associated with the peer groups.

The method is operative to generate and maintain a list of all border nodes in the peer group and to generate a matrix of tables, one table for each metric per each class of service. The table is populated by the best value associated with the corresponding metric for a particular pair of border nodes within a particular class of service. Once the table is populated, each element is placed in a group or bin. The bins are generated by dividing the full range of the metric into a plurality of smaller subgroups or bins.

The bin having a count greater than a threshold count (the threshold typically being 60 to 70% of the total count) is selected and 80% of the worst value for that group is used as the default spoke. If no bin exists having at least a threshold count, the number of bins is reduced by one and a new set of subranges is calculated. The elements of the table are placed in the newly divided bins and a scan is performed once again.

Once the default spoke is determined, exceptions and bypasses are calculated as follows. Exceptions calculated by scanning the rows of the table and determining if any values are worse than the default group. The worst value from each row is taken and made the exception from that particular port, i.e., border node, to the nucleus.

A value is made a bypass if it is 'better' than the better side of the default group. If so, it is added as a bypass between those two ports. If the number of bypasses permitted is limited, than begin with the 'best' bypass continuing until the maximum number of reached.

A few alternatives are disclosed that address the case when the number of bins is reduced to two and three. In the first alternative, if the number of bins reaches two, one of the two groups is chosen at random. A value of 80% of the worst case value is used as the default spoke.

In the second alternative, if the number of bins reaches two both groups are combined into a single group and 80% of the worst case of the combined group is chosen as the default spoke.

In the third alternative, if the number of bins reaches three, the bin having the highest count is chosen as the default group regardless of the fact that it does not contain a count at least equal to the threshold count.

There is provided in accordance with the present invention, in a Private Network to network Interface (PNNI) based Asynchronous Transfer Mode (ATM) network a method of determining a complex node representation for a logical node in a peer group, the method comprising the steps of generating a list of border nodes located within the peer group, each border node corresponding to a port in the logical node, generating a plurality of tables, each table associated with a particular metric within a particular class of service, each table populated with a plurality of elements, each element representing an optimum metric between an associated pair of ports, dividing the total range for each metric into M bins representing a subrange of the total range and placing the plurality of elements in the bins in accordance with an element's value, choosing a bin having an element count greater then a threshold and setting a default spoke value in accordance with the percentage of a value within the subrange of the bin corresponding thereto and wherein M is a positive integer.

The list may comprise a linearly linked list or a circularly linked list. The default spoke is in accordance with a percentage of a value, the value comprising the worse value within the subrange, the value being, for example, 80%.

There is also provided in accordance with the present invention, in a Private Network to network Interface (PNNI) based Asynchronous Transfer Mode (ATM) network a method of determining a complex node representation for a logical node in a peer group, the method comprising the steps of generating a list of border nodes located within the peer group, each border node corresponding to a port in the logical node, generating a plurality of tables, each table associated with a particular metric within a particular class of service, each table populated with a plurality of elements, each element representing an optimum metric between an associated pair of ports, dividing the total range for each metric into M bins representing a subrange of the total range and placing the plurality of elements in the bins in accordance with an element's value, choosing a bin having an element count greater then a threshold and setting a default spoke value in accordance with the percentage of a value within the subrange of the bin corresponding thereto, decrementing the number of bins M by one if no bin has an element count greater then the threshold and repeating the steps of dividing the total range, placing the plurality of elements in the bins and choosing a bin and wherein M is a positive integer.

The method further comprises the step of choosing one group at random from among the two remaining bins when the number of bins M is decremented to two, and setting the default spoke in accordance with the percentage of a value within the subrange of the chosen bin. The method further comprises the step of combining the two remaining bins when the number of bins M is decremented to two, and setting the default spoke in accordance with the percentage of a value within the total range of the metric corresponding thereto. The method further comprises the step of choosing one group from among the three remaining bins when the number of bins M is decremented to three, and setting the default spoke in accordance with the percentage of a value within the subrange of the chosen bin.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ACR | Available Cell Rate |
| AESA | ATM End System Address |
| AINI | ATM Inter Network Interface |
| ANSI | American National Standards Institute |
| ATM | Asynchronous Transfer Mode |
| CCITT | Comite Consulatif International Telegraphique et Telephonique |
| CDV | Cell Delay Variation |
| CTD | Cell Transfer Delay |
| DS | Database Summary |
| DTL | Designated Transit List |
| FDDI | Fiber Distributed Data Interface |
| FSM | Finite State Machine |
| IE | Information Element |
| IISP | Interim Inter-Switch Signaling Protocol |
| ITU | International Telecommunications Union |
| NCCI | Network Connection Correlation Identifier |
| PCR | Peak Cell Rate |
| PNNI | Private Network to Network Interface |
| PTSE | PNNI Topology State Element |
| PTSP | PNNI Topology State Packet |
| PVC | Permanent Virtual Circuit |
| PVP | Permanent Virtual Path |
| QoS | Quality of Service |
| RCC | Routing Control Channel |
| SVC | Switched Virtual Circuit |
| SVP | Switched Virtual Path |
| UNI | User to Network Interface |
| VCC | Virtual Channel Connection |

The present invention is a method of calculating a complex node representation for a logical node in a PNNI ATM network. To better understand the principles of the present invention, a short description of complex node representation is presented herein as described in the ATM Forum Private Network to Network Interface (PNNI) Specification Version 1.0, af-pnni-0055.000, March 1996.

Logical Nodes

If the PNNI protocol supported only a flat network representation, then each lowest level node would be required to maintain the entire topology of the network, including information for every physical link in the network and reachability information for every node in the network. Although feasible for small networks, this would create enormous overhead for larger networks. Utilizing the PNNI routing hierarchy reduces this overhead while providing for efficient routing.

The PNNI hierarchy begins at the lowest level where the lowest-level nodes are organized into peer groups. A 'logical node' in the context of the lowest hierarchy level is a lowest-level node. Note that logical nodes are often denoted as 'nodes'. A peer group (PG) is a collection of logical nodes, each of which exchanges information with other members of the group, such that all members maintain an identical view of the group. Logical nodes are uniquely and unambiguously identified by 'logical node IDs'.

Figure 1:
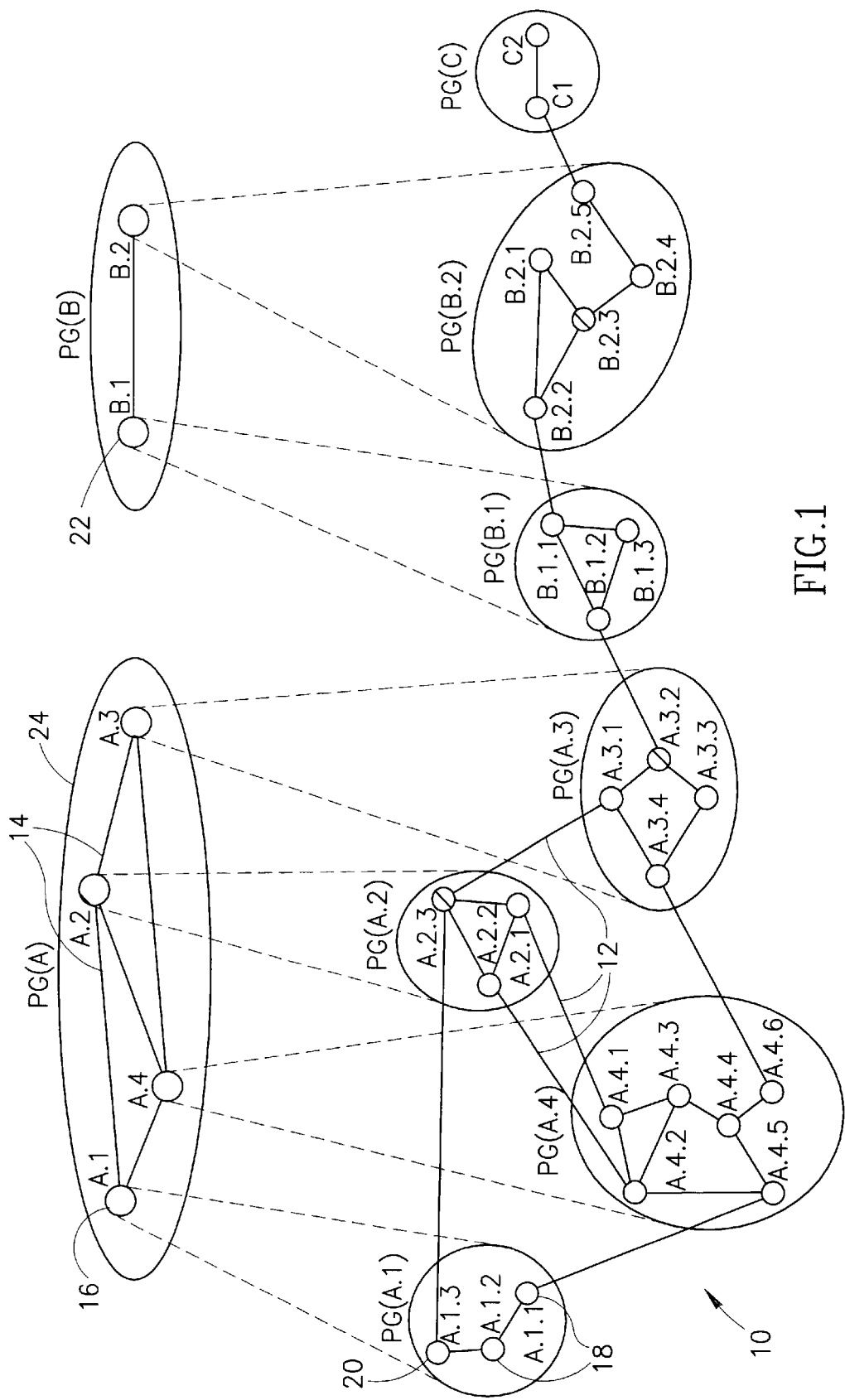
FIG. 1 is a diagram illustrating an example ATM network comprising a plurality of peer groups and two levels of hierarchy.

In the example PNNI network shown in FIG. 1, the network, generally referenced is organized into 7 peer groups A.1, A.2, A.3, A.4, B.1, B.2, and C. Node and peer group numbering, such as A.3.2 and A.3, is for identification purposes only. It is an abstract representation that reflects the hierarchical structure being described. For example, the node denoted by A.3.2 is located in peer group A.3.

A peer group is identified by its 'peer group identifier'. Peer group IDs are specified at configuration time. Neighboring nodes exchange peer group IDs using 'Hello packets'. If they have the same peer group ID then they belong to the same peer group. If the exchanged peer group IDs are different, then the nodes belong to different peer groups.

A 'border node' has at least one link that crosses the peer group boundary. Hence, neighboring nodes with different peer group IDs are border nodes of their respective peer groups. In the presence of certain errors or failures, peer groups can partition, leading to the formation of multiple peer groups with the same peer group ID.

The peer group ID is defined as 14 bytes on an ATM End System Address, where the most significant byte is the level value and the remaining 13 bytes are the 13 bytes of the node's prefix. Only the most significant bits that are up to the level's length remain as they are while the remainder of the bits are set to zero. Thus, the peer group ID can default to a prefix that had the same bits up to the level in all the prefixes in the nodes belonging to the same peer group.

Logical nodes are connected by one or more 'logical links'. Between lowest level nodes, a logical link is either a physical link or a VPC between two lowest-level nodes. Links between lowest level nodes in the same peer group are not aggregated. For example, if two physical links were to connect the same pair of lowest-level nodes then they would be represented by two separate logical links. Logical links inside a peer group are 'horizontal links' whereas links that connect two peer groups are 'outside links'.

When a logical link becomes operational, the attached nodes initiate an exchange of information via a well-known VCC used as a PNNI Routing Control Channel (RCC). Hello packets sent periodically by each node on this link specify the ATM End System Address, node ID, and its port ID for the link. In this way the Hello protocol makes the two neighboring nodes known to each other. As stated previously, the PNNI Hello protocol also supports the exchange of peer group IDs so that neighboring nodes can determine whether they belong to a same peer group or to different peer groups. Note that the Hello protocol runs as long as the link is operational. It can therefore act as a link failure detector when other mechanisms fail.

Each node exchanges Hello packets with its immediate neighbors and thereby determines its local state information. This state information includes the identity and peer group membership of the node's immediate neighbors and the status of its links to the neighbors. Each node then bundles its state information in PNNI Topology State Elements (PTSEs), which are reliably flooded throughout the peer group.

PTSEs are the smallest collection of PNNI routing information that is flooded as a unit among all logical nodes within a peer group. A node's topology database consists of a collection of all PTSEs received, which represent that node's present view of the PNNI routing domain. In particular, the topology database provides all the information required to compute a route from the given node to any address reachable in or through that routing domain.

A 'logical group node' is an abstraction of a peer group for the purpose of representing that peer group in the next PNNI routing hierarchy level. For example, with reference to FIG. 1, logical group node A.2 represents peer group A.2 in the next higher level peer group A. Note that FIG. 1 shows only one example way that the lower level peer groups can be organized into the next level of peer group hierarchy.

The functions of the logical group node and the peer group leader of its child peer group are closely related. The functions of these two nodes may or may not be executed in the same system.

The functions of a logical group node include aggregating and summarizing information about its child peer group and flooding that information into its own peer group. A logical group node also passes information received from its peer group to the PGL of its child peer group for flooding. A logical group node does not participate in PNNI signaling.

A logical group node is identified by a node ID which by default contains the peer group ID of the peer group that the node is representing. A logical group node is addressable by a unique ATM End System Address that may, for example, correspond to the address of the lowest-level node in the same switching system but with a different Selector value.

The manner in which a peer group is represented depends on the policies and algorithms of the peer group leader. Thus, given two potential peer group leaders that implement the same policies and algorithms, the representation of the peer group does not depend on which of the two is elected.

Note that logical group nodes 16 in FIG. 1 are organized into peer groups 24. For example, logical nodes A.1, A.2, A.3 and A.4 are organized into peer group A. This higher level peer group is a peer group except that each of its nodes represents a separate lower level peer group. Consequently, peer group A has a peer group leader, generally referenced 22, (logical group node A.2 in particular) chosen by the leader election process. Note that the functions that define the peer group leader of A are located in node A.2, which is in turn, implemented on the switching system containing lowest-level node A.2.3.

Peer group A is called the 'parent peer group' of peer groups A.1, A.2, A.3 and A.4. Conversely, peer groups A.1, A.2, A.3 and A.4 are called 'child peer groups' of peer group A. A parent peer group is identified by a level that must be shorter in length than its child's level. Any node capable of becoming peer group leader must be configured with its parent peer group ID. The length of a peer group ID indicates the level of that peer group within the PNNI hierarchy. This length is referred to as the 'level indicator'. PNNI levels are not dense, in the sense that not all levels will be used in any specific topology. For example, a peer group with an ID of length 'n' bits may have a parent peer group whose ID ranges anywhere from 0 to n-1 bits in length.

Similarly, a peer group with an ID of length 'm' bits may have a child peer group whose identifier ranges anywhere from m+1 to 104 bits in length. Note that 104 is the maximum peer group ID length and corresponds to 13 octets.

A logical group node represents an entire underlying peer group. The associated peer group leader 20, as a member of the underlying peer group, receives complete topology state information from all nodes 18 in the peer group. This provides the peer group leader with all of the required information to instantiate the logical group node. Conceptually this may be thought of as the peer group leader feeding information up to the logical group node it instantiates. This upward flow includes two types of information: reachability and topology aggregation.

Reachability refers to summarized address information needed to determine which addresses can be reached through the lower level peer group. Topology aggregation refers to the summarized topology information needed to route into and across this peer group. There is a filtering function inherent in the summarization process that propagates only the information needed by the higher levels. PTSEs never flow up the hierarchy. Rather, the summarized information is advertised within PTSEs originated by the logical group node and flooded to its peers.

Summarizing information up the PNNI routing hierarchy is necessary for creating the hierarchy itself and for distributing routing information about child peer groups. Conversely, feeding information down the hierarchy is necessary to allow nodes in the lower level peer groups to route to all destinations reachable via the PNNI routing domain. Route computation uses this information to select routes to destinations.

Each logical group node feeds information down to its underlying peer group. The information fed down consists of all PTSEs it originates or receives via flooding from other members of the LGN's peer group. Each PTSE that flows down to a peer group leader is flooded across that peer group. This gives every node in a peer group a view of the higher levels into which it is being aggregated. In summary, PTSEs flow horizontally through a peer group and downward into and through child peer groups. When neighboring nodes conclude from the Hello protocol that they belong to different peer groups, they become border nodes. For example, nodes A.3.4 and A.4.6 are border nodes. Links 12 between border nodes in different peer groups are called outside links. There is no database exchange across outside links; the only PNNI protocol flows are for the Hello protocol. Border nodes extend the Hello protocol across outside links to include information (the nodal hierarchy list) about their respective higher level peer groups and the logical group nodes representing them in these peer groups. This information allows the border nodes to determine the lowest level peer group common to both border nodes. For example, the border nodes A.3.4 and A.4.6 identify that they have peer group A in common.

In this fashion, each node knows the complete topology (including nodes and links) within its peer group, as well as the complete (summarized) topology of the higher level parent peer group and grand-parent peer group, etc. In order for the node to realize which border nodes have connectivity to which higher level nodes, the border nodes must advertise links to those higher level nodes. These are called uplinks (not shown). The node at the other end of the uplink, the upnode, is always a neighboring peer of one of its ancestor nodes.

Neighboring PNNI nodes have a routing control channel for the exchange of PNNI routing information. Neighboring nodes at their lowest level of the PNNI routing hierarchy use a reserved VCC for their routing control channel. The routing control channel 14 between logical group nodes 16 is an SVCC. The information required to establish this SVCC is derived from the uplink advertisements in the peer group represented by the logical group node.

Nodal and Link Aggregation

Topology aggregation is the notion of reducing nodal as well as link information to achieve scaling in a large network. It is not only motivated by the need for complexity reduction but also to hide the topology internals of peer groups in the interest of security. Link aggregation refers to the representation of some set of links between the same two peer groups by a single logical link. For example, with reference to FIG. 1, the link connecting node A.2 to A.4 represents the aggregation of the two links (A.2.1–A.4.1) and (A.2.2–A.4.2).

Logical group nodes are responsible for link aggregation. A logical group node examines all of the uplink advertisements from its child peer group to a specific upnode. All uplinks to the same upnode with the same aggregation token, as the result of configuration, are aggregated into a single link. This link could be either a horizontal link, if the upnode is a peer of the logical group node, or an induced uplink otherwise.

Nodal aggregation is the process of representing a child peer group by a logical group node in its parent peer group. The 'complex node representation' is used to represent the result of this aggregation in the parent peer group. The complex node representation can also be used to model a lowest-level node.

Complex Node Representation

Figure 2:
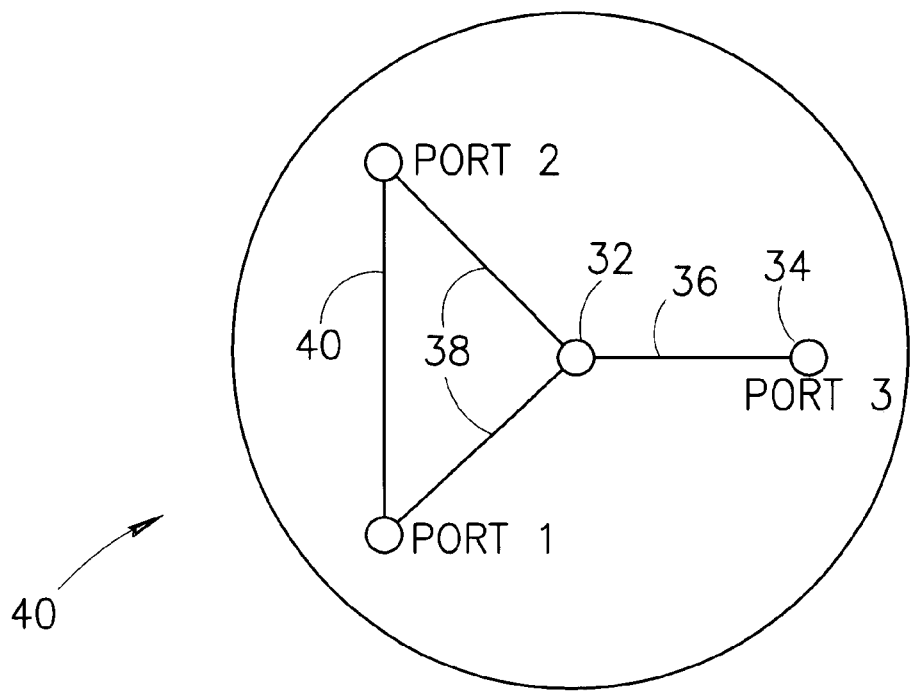
FIG. 2 is a diagram illustrating an example complex node representation of a logical node.

A diagram illustrating an example complex node representation of a logical node is shown in FIG. 2. The simplest complex node representation, generally referenced 30, is a symmetric star topology with a uniform radius. The center 32 of the star is the interior reference point of the logical node and is referred to as the nucleus. The logical connectivity between the nucleus and a port 34 of the logical node is referred to as a spoke 38. The concatenation of two spokes represents traversal of a symmetric peer group. The symmetric star topology is used as the 'default node representation,' which consists of a single value for each nodal state parameter giving a presumed value between any entry or exit of the logical node and the nucleus, in either direction.

Usually, however, peer groups are not symmetric. For example, they may contain 'outliers', i.e., nodes whose removal would significantly improve the peer group symmetry. This asymmetry can be modeled by a set of 'exceptions' 36. Exceptions can be used to represent particular ports whose connectivity to the nucleus is significantly different from the default. Additionally, an exception, referred to as a bypass 40, can be used to represent connectivity between two ports that is significantly better than that implied by traversing the nucleus.

The complex node representation is illustrated in the following example. Consider peer group A.4 in FIG. 1 and its summarization into the complex node represented in FIG. 2. The nucleus 32 represents the inside of the logical group node A.4. Each spoke 38 emanating from the nucleus is associated with a port of the logical group node A.4. FIG. 2 includes three spokes, one for each port. The three ports relate to FIG. 1 as follows: Port 1 represents the port on link (A.4–A.1); Port 2 represents the port on link (A.4–A.2); and Port 3 represents the port on link (A.4–A.3).

Note that the spokes for ports 1 and 2 use the default attributes, while the spoke for port 3 is an exception. One possible cause for the exception might be if nodes A.4.1 through A.4.5 are closely clustered whereas node A.4.6 is a distant outlier.

Node traversal can also be modeled by an exception that bypasses the nucleus. For example, the bypass 40 joining port 1 to port 2 corresponds to traversing A.4 when going between nodes A.1 and A.2. This bypass could be caused by a very high speed bypass link between nodes A.4.2 and A.4.5, for example.

Logical node A.4 distributes its complex node representation via flooding of PTSEs to nodes A.1, A.2 and A.3. The PTSEs are then passed down to the respective peer group leaders who, in turn, flood them across their own groups with the result that the topology databases of all nodes in peer groups A.1, A.2, A.3, and A.4 contain the complex node representation of A.4.

Routing across a logical group node corresponds to choosing a concatenation of spokes and/or bypasses. There is never a case where more than two spokes are included in such a concatenation or there would be a loop. The concatenation must be selected to meet the resource requirements of the call. For example, with reference to FIGS. 1 and 2 assume logical link (A.1–A.2) is congested so that node A.3.4 routes to a node inside peer group A.1 either via logical links (A.3–A.4), (A.4–A.1) or (A.3–A.2), (A.2–A.4), (A.4–A.1). Furthermore, assume that the two paths are equivalent from the routing criteria point of view (plausible since both traverse similar number of links). Then path selection corresponds to choosing the best of the following three possible complex node traversals: (1) concatenation of the two spokes with default attributes; (2) concatenation of the exception spoke 36 and a spoke with default attributes; and (3) bypass 40.

If the best option is to use the bypass 40 then route (A.3–A.2), (A.2–A.4), (A.4–A.1) is the preferred route. Node A.3.4 will therefore use the link (A.4.2–A.4.5) when routing to a node inside peer group A.1. Note that routing to an internal reachable address in a logical group node corresponds to choosing a spoke or a concatenation of bypasses and a spoke to the nucleus with acceptable attributes.

A complex node representation is a collection of nodal state parameters that provide detailed state information associated with a logical node. It is used to express the case where traversing into or across a node has a significant effect on the end-to-end parameter values of connections.

To accommodate traversing a logical node as well as routing to the 'inside' of the node, a symmetric star topology with a uniform 'radius' is used. The center of the star is the interior reference point of the logical node, and is referred to as the nucleus. The logical connectivity between the nucleus and a port of the logical node is referred to as a spoke. PNNI Routing supports a default node representation, which consists of a single value for each nodal state parameter, giving a presumed value between any entry or exit of the logical node and the nucleus, in either direction.

For each nodal state parameter associated with a logical node, a 'radius' is derived from the 'diameter' of the logical node. For a nodal metric, the 'radius' is simply half the 'diameter'. For a nodal attribute, the 'radius' is the same as the 'diameter'. PNNI Routing, however, does not specify how the aggregation is taken to determine the 'diameter'. A conservative advertiser may take worst case values. Aggressive advertisers may consider the average case, or even the best case.

Note that in this context and throughout this document, the term 'half' refers to finding a metric value that when algorithmically combined with itself will produce the value that is to be halved. It is important to note that halving this value does not necessarily imply a traditional arithmetic division by two.

The default node representation offers the greatest reduction of advertised information (short of using the simple node representation). It cannot, however, fully capture the multiple connectivity in a typical logical node or reflect asymmetric topology information.

Given that a logical node is in general not perfectly round, PNNI Routing permits the topology state parameters associated with any given spoke to be different from the default 'radius'. In addition, direct port to port connectivities, known as 'bypasses', may also be advertised.

Using this, one may advertise practically any aggregated topology ranging from a symmetric star to a full mesh. A connectivity advertisement that represents something other than the default node representation is called an exception.

The complex node representation for PNNI Routing can be constructed as described below:

1. Conceptually overlay on each logical node a star topology with a nucleus representing the 'inside' of the corresponding node, and spokes connecting the ports of the logical node to the nucleus. Each port ID must be the same as the port ID used to identify the link or reachable addresses associated with the port.

2. For each nodal state parameter, advertise a 'radius' to be used as the default value for the spokes.

3. Any spoke or any logical connectivity between a pair of ports may be designated as an 'exception'.

4. For each such exception, advertise the entire set of nodal state parameters associated with it. For bypasses, nodal state parameters must be specified in both directions.

5. For each spoke advertised as an exception, the exception nodal state parameters supersede the default information in the directions in which the exceptions are specified.

6. A path through the logical node is obtained from a concatenation of any number of bypasses and at most two spokes (default or exception) in the complex node representation.

With the above complex node representation, one may choose to advertise conservatively or aggressively depending on parameter values assigned to the 'radius' and 'exceptions'. PNNI Routing does not specify how spokes and bypasses are selected to be advertised as exceptions.

The hierarchical summarization described above allows nodes in the highest level of the hierarchy to calculate routes to any destination represented in the highest level peer group (including systems reachable via lower levels, which are announced via summary address prefixes). It is necessary, however, for all nodes in the PNNI network to be able to route calls to any destination, not just nodes actually at the highest level of the hierarchy. This implies that the topological information describing the higher levels of the hierarchy must be available to the lower level nodes.

This requires that all nodes participating in PNNI routing maintain information in their topology databases (and the capability of calculating routes) not only for their own peer group, but also for all of their ancestor peer groups. The higher level PTSEs are flooded to all nodes of their peer group, and in addition are flooded to all nodes of all descendant peer groups, allowing all nodes to directly calculate appropriate routes (even those nodes which are not explicitly represented in the summarized higher level topology).

Flooding of PTSEs to all nodes of all descendant peer groups (i.e., to all lower-level nodes contained in the lower-level peer groups represented by the nodes in this peer group, and so on), is achieved as follows:

1. When originating a new PTSE or updating a PTSE that it had previously originated, a higher-level node floods the PTSE to the PGL of the peer group that the higher-level node represents, as well as the usual process of flooding to all neighboring peers at its level. The PGL will, in turn, flood the PTSE in the child peer group.

2. When flooding a received PTSE that is new or more recent than its topology database copy, a higher-level node floods the PTSE to the PGL of the peer group that the higher-level node represents, as well as the usual process of flooding to all neighboring peers at its level other than the one from which the PTSE was originally received. The PGL will, in turn, flood the PTSE in the child peer group.

PTSEs generated in a given peer group never get flooded to the next higher level peer group. Instead, the peer group leader summarizes the topology of the peer group based on the PTSEs generated within the peer group, but the summary is flooded in new PTSEs originated by the LGN at the parent peer group's level.

The PNNI complex node representation is a flexible scheme for describing the connectivity within a logical node. When a logical group node produces a complex node representation, it makes a tradeoff between the accuracy of that representation and its size. Alternatively, it may use the simple node representation, in which the entire LGN is treated as a point, with no resource constraints. It is important to point out that the PNNI specification does not disclose the algorithms used to derive the aggregated topology description and states that they are implementation specific.

Figure 3A:
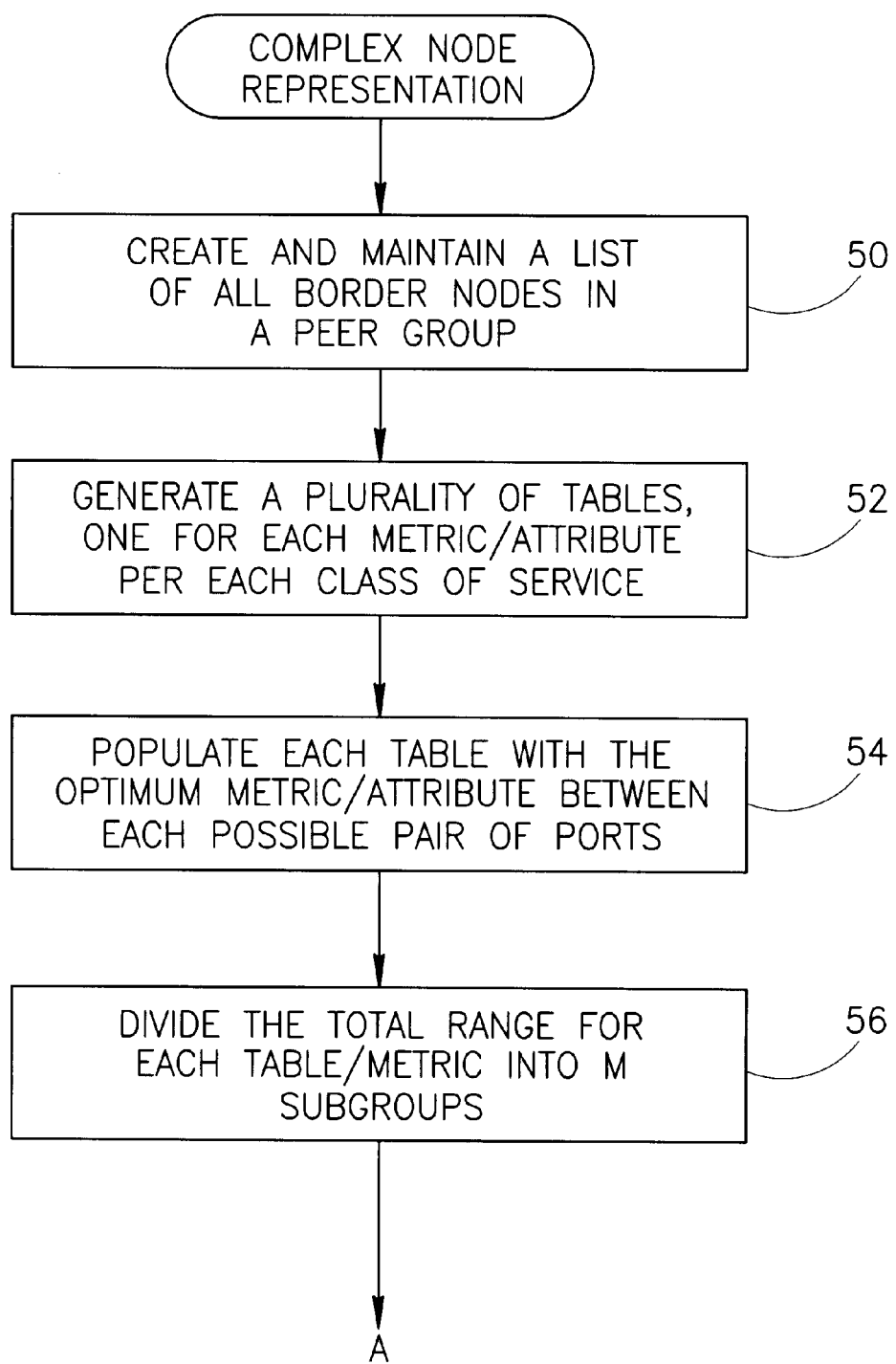
FIGS. 3A, 3B and 3C are flowing diagrams is a flow diagram illustrating the complex node representation method of the present invention.
Figure 3B:
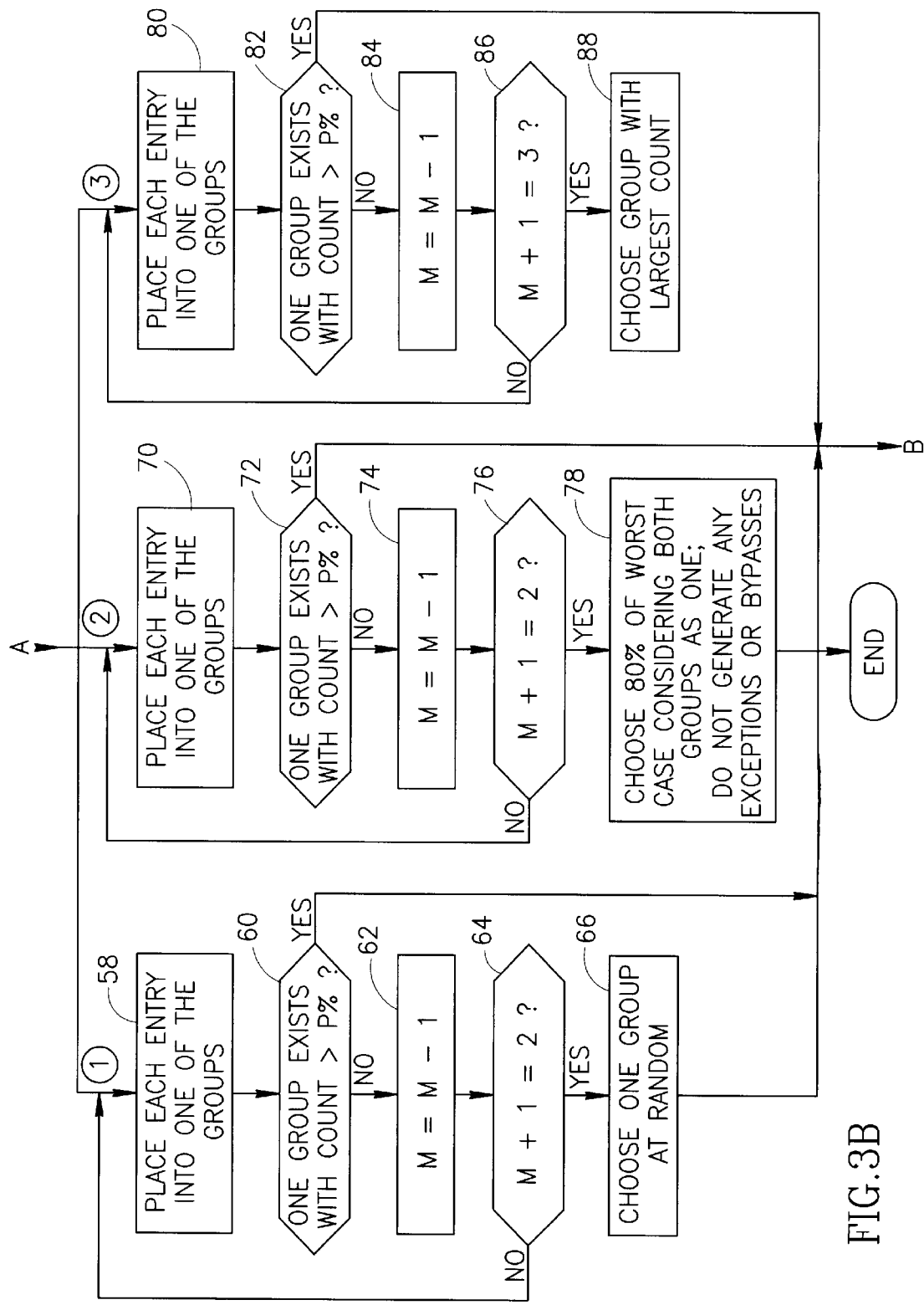
Figure 3C:
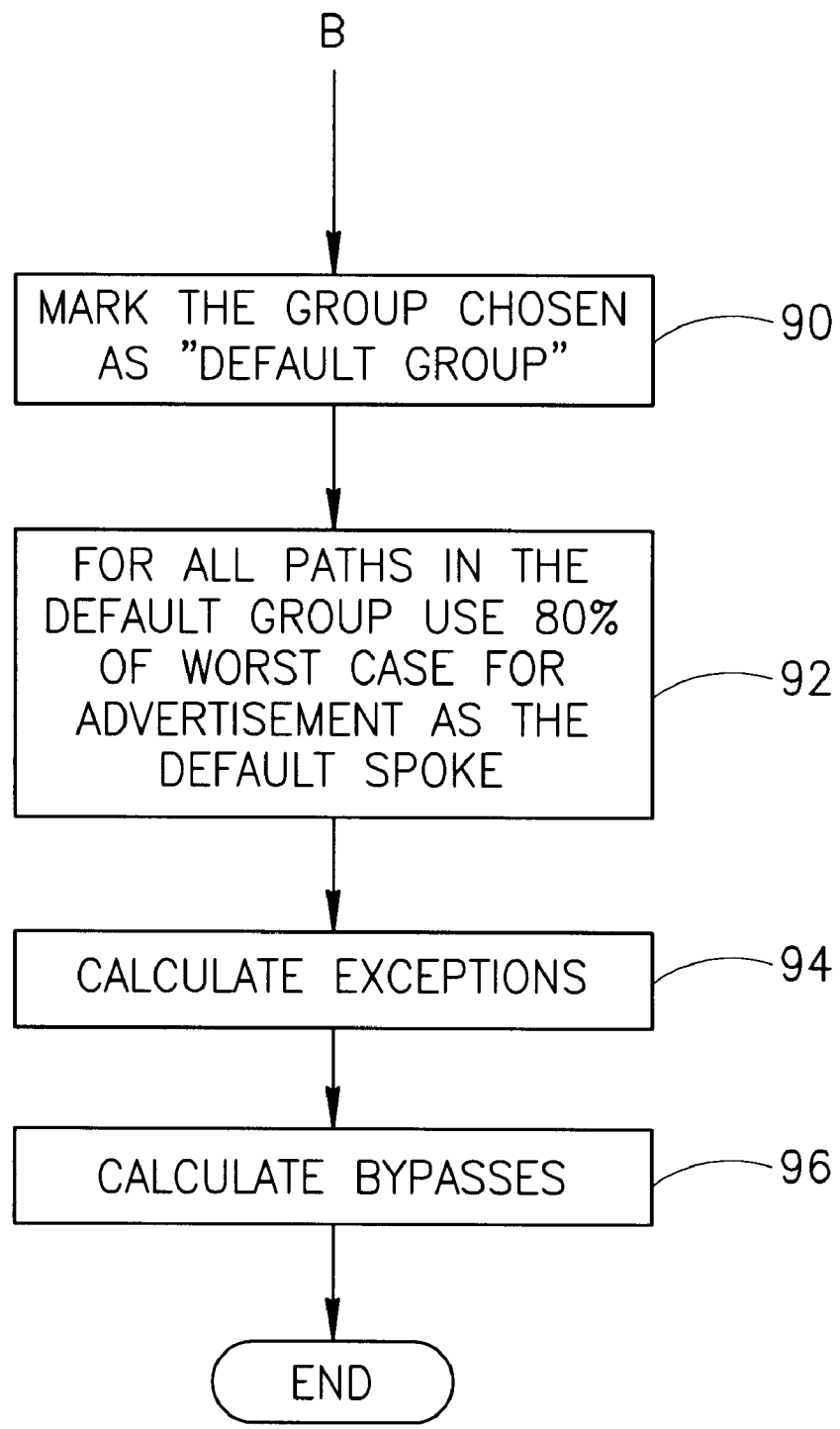

In accordance with the present invention, a method of representing a complex node is provided. The method will now be described in more detail. A flow diagram illustrating the complex node representation method of the present invention is shown in FIGS. 3A, 3B and 3C.

The operation of the method requires the creation and maintenance of several entities within the node that implements the logical group node, which is typically the peer group leader in the peer group. First, a list of all border nodes within a peer group is created and maintained (step 50). Nodes placed on the list are nodes that advertised at least one uplink. The list may be implemented using any suitable technique such as linearly linked lists, but is preferably implemented using a circular linked list of pointers to the border nodes of the peer group that is being summarized. When a node becomes a border node it is added to the list and when a node is no longer a border node, it is deleted from the list, i.e., the last uplink of the node is flushed.

Figure 4:
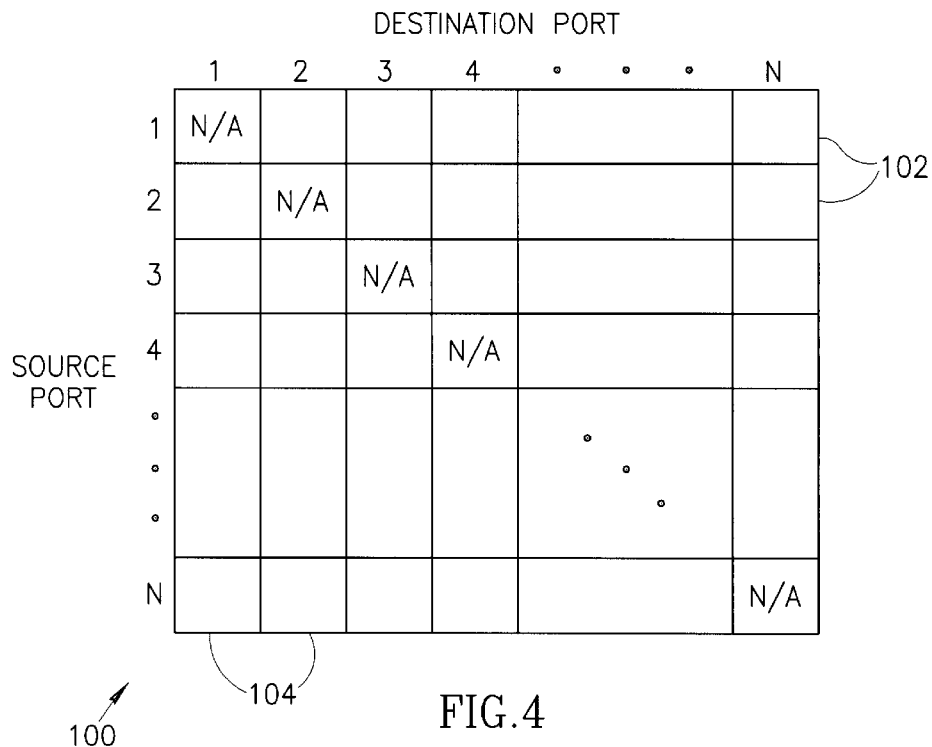
FIG. 4 is a diagram illustrating the structure of the tables used to calculate the complex node representation of a logical node.

Second, a matrix of tables is generated for each node on the list created in the previous step (step 52). For each advertised metrics per each class of service (CoS) a separate table is constructed. A diagram illustrating the structure of the tables used to calculate the complex node representation of a logical node is shown in FIG. 4. Each table, generally referenced 100, comprises a plurality of rows and columns representing the border nodes in the peer group. Each entry in the table (except for the diagonal which is not applicable) comprises the metric value associated with the 'best' path between any two border nodes which is determined by optimizing on the particular metric. Each table is populated in this fashion with the optimum metric associated with the path between each possible pair of border nodes, i.e., ports (step 54).

Figure 5:
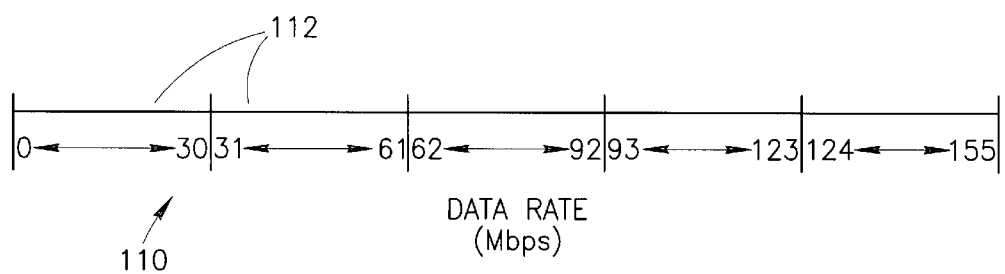
FIG. 5 is a diagram illustrating an example division of a metric into a plurality of subgroups.

For each table, i.e., each metric, the maximum possible range for the associated metric is divided into M subgroups or bins (step 56). The initial value of M may be any positive integer but is preferably 5. Thus, the range of values for the metric is divided into 5 subgroups each 20% of the total range. A diagram illustrating an example division of a metric into a plurality of subgroups is shown in FIG. 5. As an example, consider the data rate metric. The data rate can range from 0 to 155 Mbps as shown by the total range 110. Thus, initially, the range is divided into 5 subgroups 112 wherein each has a range of 31 Mbps.

At this point, the method provides three alternatives. Note that additional alternatives are possible, but only three are presented herein. One skilled in the network arts can modify the method presented to meet requirements according to the particular application. The three alternatives are indicated in FIG. 3 by the circled numbers. They will be described in sequential order beginning with alternative #1.

Once the total range of the metric is subdivided into a plurality of subranges, each element in the table is then placed in one of the groups in accordance with its value. Once all the elements have been placed in a group, each of the bins is scanned and the number of elements contained in each is counted (step 58).

If there is one group whose count is at least a certain percent P of the total count for all the bins (step 60), then that bin (group) is marked as the default group (step 90). Note that P can be any number and can be set by the network manager. Preferably, P has a value of from 60 to 70%.

If no one bin has a count of at least P% of the total, then M is decremented by one (step 62) and the process repeats. First, however, it is checked whether the number of bins has been reduced to 2, i.e., M equals 1 (step 64). If not, the steps of placing the elements into the newly allotted number of bins and tallying the total number of elements in each bin is repeated.

If the number of bins has been reduced to two (step 64), one of the two groups is chosen at random and this group is marked as the default group (step 90). Next, for all the paths in the default group, 80% of the worst value is used for advertisement as the default spoke (step 92). Note that half the default value is actually used because it represents the radius, i.e., spoke, and not the diameter. The elements in the metric tables correspond to the diameter, i.e., between two border nodes, and not the radius.

All the other values in the default group are ignored and not made exceptions. Note that in using 80% of the worst value, the best value and the worst value are avoided, representing a conservative compromise. Any inaccuracies will be taken care of by the crankback mechanism. Note, however, that the number of crankbacks is minimized by using a value that is skewed towards the worst value. If the worst value is used as the default value, some of the calls would not be established due to a lack of resources as wrongly perceived by other nodes.

Next, any exceptions are calculated (step 94). Exceptions are calculated by scanning the rows of the table and determining if any values are worse than the default group. The worst value from each row is taken and made the exception from that particular port, i.e., border node, to the nucleus.

Bypasses are then calculated (step 96). A value is made a bypass if it is 'better' than the better side of the default group. If so, it is added as a bypass between those two ports. Note that if the number of bypasses permitted is limited, than begin with the 'best' bypass continuing until the maximum number is reached.

The second alternative will now be described. Alternative #2 is similar that of #1 with the major difference being a different step performed when the number of bins is reduced to two. In particular, as in the first alternative, once the total range of the metric is subdivided into a plurality of subranges, each element in the table is placed in one of the groups in accordance with its value. Once all the elements have been placed in a group, each of the bins is scanned and the number of elements contained in each is counted (step 70). If there is one group whose count is at least a certain percent P of the total count for all the bins (step 72), then that bin (group) is marked as the default group (step 90).

If no one bin has a count of at least P% of the total, then M is decremented by one (step 74) and the process repeats. First, however, it is checked whether the number of bins has been reduced to 2, i.e., M equals 1 (step 76). If not, the steps of placing the elements into the newly allotted number of bins and tallying the total number of elements in each bin is repeated.

If the number of bins has been reduced to two (step 76), both remaining groups are considered as a single group and 80% of the worst value is used for advertisement as the default spoke (step 78). In this case, no exceptions or bypasses are generated.

The third alternative will now be described. Alternative #3 is similar that of #1 with the major difference being a different step performed when the number of bins is reduced to three. In particular, as in the first alternative, once the total range of the metric is subdivided into a plurality of subranges, each element in the table is placed in one of the groups in accordance with its value. Once all the elements have been placed in a group, each of the bins is scanned and the number of elements contained in each is counted (step 80). If there is one group whose count is at least a certain percent P of the total count for all the bins (step 82), then that bin (group) is marked as the default group (step 90).

If no one bin has a count of at least P% of the total, then M is decremented by one (step 84) and the process repeats. First, however, it is checked whether the number of bins has been reduced to 3, i.e., M equals 2 (step 86). If not, the steps of placing the elements into the newly allotted number of bins and tallying the total number of elements in each bin is repeated.

If the number of bins has been reduced to three and no group has P% of the total count (step 86), the group having the largest count from among the three remaining groups is chosen (step 88). The group chosen is then marked as the default group (step 90). Next, for all the paths in the default group, 80% of the worst value is used for advertisement as the default spoke (step 92). All the other values in the default group are ignored and not made exceptions. Note that in using 80% of the worst value, the best value and the worst value are avoided, representing a conservative compromise. As described above, any inaccuracies will be taken care of by the crankback mechanism.

Next, any exceptions are calculated (step 94). Exceptions are calculated by scanning the rows of the table and determining is any values are worse than the default group. The worst value from each row is taken and made the exception from that particular port, i.e., border node, to the nucleus.

Bypasses are then calculated (step 96). A value is made a bypass if it is 'better' than the better side of the default group. If so, it is added as a bypass between those two ports. Note that if the number of bypasses permitted is limited, than begin with the 'best' bypass continuing until the maximum number is reached.

While the invention has been described with respect to a limited number of embodiments, it will be appreciated that many variations, modifications and other applications of the invention may be made.

What is claimed is:

1. In a Private Network to network Interface (PNNI) based Asynchronous Transfer Mode (ATM) network a method of determining a complex node representation for a logical node in a peer group, said method comprising the steps of:

generating a list of border nodes located within said peer group, each border node corresponding to a port in said logical node;

generating a plurality of tables, each table associated with a particular metric within a particular class of service, each table populated with a plurality of elements, each element representing an optimum metric between an associated pair of ports;

dividing the total range for each metric into M bins representing a subrange of said total range and placing said plurality of elements in said bins in accordance with an element's value;

choosing a bin having an element count greater then a threshold and setting a default spoke value in accordance with the percentage of a value within the subrange of the bin corresponding thereto; and wherein M is a positive integer.

2. The method according to claim 1, wherein said list comprises a linearly linked list.

3. The method according to claim 1, wherein said list comprises a circularly linked list.

4. The method according to claim 1, wherein the initial value of M is set to 5.

5. The method according to claim 1, wherein said default spoke is in accordance with a percentage of a value, said value comprising the worse value within said subrange.

6. The method according to claim 1, wherein said default spoke is in accordance with 80% of the worse value within said subrange.

7. In a Private Network to network Interface (PNNI) based Asynchronous Transfer Mode (ATM) network a method of determining a complex node representation for a logical node in a peer group, said method comprising the steps of:

generating a list of border nodes located within said peer group, each border node corresponding to a port in said logical node;

generating a plurality of tables, each table associated with a particular metric within a particular class of service, each table populated with a plurality of elements, each element representing an optimum metric between an associated pair of ports;

dividing the total range for each metric into M bins representing a subrange of said total range and placing said plurality of elements in said bins in accordance with an element's value;

choosing a bin having an element count greater then a threshold and setting a default spoke value in accordance with the percentage of a value within the subrange of the bin corresponding thereto;

decrementing the number of bins M by one if no bin has an element count greater then said threshold and repeating said steps of dividing said total range, placing said plurality of elements in said bins and choosing a bin; and wherein M is a positive integer.

8. The method according to claim 7, further comprising the step of choosing one group at random from among the two remaining bins when said number of bins M is decremented to two, and setting said default spoke in accordance with the percentage of a value within the subrange of said chosen bin.

9. The method according to claim 7, further comprising the step of combining the two remaining bins when said number of bins M is decremented to two, and setting said default spoke in accordance with the percentage of a value within the total range of the metric corresponding thereto.

10. The method according to claim 7, further comprising the step of choosing one group from among the three remaining bins when said number of bins M is decremented to three, and setting said default spoke in accordance with the percentage of a value within the subrange of said chosen bin.

11. The method according to claim 7, wherein said list comprises a linearly linked list.

12. The method according to claim 7, wherein said list comprises a circularly linked list.

13. The method according to claim 7, wherein the initial value of M is set to 5.

14. The method according to claim 7, wherein said default spoke is in accordance with a percentage of a value, said value comprising the worse value within said subrange.

15. The method according to claim 7, wherein said default spoke is in accordance with 80% of the worse value within said subrange.

* * * * *